United States Patent [19]

Ohmuro

[11] Patent Number: 5,777,674
[45] Date of Patent: Jul. 7, 1998

[54] FOUR COLOR SEPARATION OPTICAL DEVICE

[75] Inventor: Ryuji Ohmuro, Yokohama, Japan

[73] Assignee: Canon Kabushiki Kaisha, Tokyo, Japan

[21] Appl. No.: 419,233

[22] Filed: Apr. 10, 1995

[30] Foreign Application Priority Data

Apr. 11, 1994 [JP] Japan ................. 6-072032

[51] Int. Cl.$^6$ .................. H04N 9/07; H04N 5/225
[52] U.S. Cl. ................. 348/338; 348/265; 348/614; 356/419; 359/638; 359/640; 369/108
[58] Field of Search .................. 369/108, 112; 359/629, 534, 635, 638, 639, 640, 831, 837; 356/406, 416, 419; 348/262, 265, 335, 336, 337, 338, 340, 614; H04N 9/07, 5/225, 9/109

[56] References Cited

U.S. PATENT DOCUMENTS

| | | | |
|---|---|---|---|
| 3,659,918 | 5/1972 | Tan | 350/166 |
| 3,932,027 | 1/1976 | Cook et al. | 350/173 |
| 4,236,177 | 11/1980 | Ohshima et al. | 358/55 |
| 4,507,679 | 3/1985 | Bendell | 358/55 |
| 4,857,997 | 8/1989 | Fukami et al. | 358/55 |
| 4,873,569 | 10/1989 | Hirosawa | 358/75 |
| 4,916,529 | 4/1990 | Yamamoto et al. | 358/50 |
| 5,134,468 | 7/1992 | Ohmuro | 358/50 |
| 5,327,289 | 7/1994 | Watanabe et al. | 359/634 |
| 5,436,661 | 7/1995 | Yamamoto et al. | 348/264 |
| 5,471,323 | 11/1995 | Suetsugi et al. | 358/511 |

FOREIGN PATENT DOCUMENTS

| | | | |
|---|---|---|---|
| 1462828 | 8/1969 | Germany. | |
| 59-117884 | 7/1984 | Japan | H04N 9/04 |
| 60-42702 | 3/1985 | Japan | G02B 5/04 |

Primary Examiner—Andrew Faile
Assistant Examiner—Ngoc-Yen Vu
Attorney, Agent, or Firm—Fitzpatrick, Cella, Harper & Scinto

[57] ABSTRACT

A color separation prism in which are arranged, in the order according to the direction in which the light from the objective travels: a first prism which extracts a predetermined wavelength component; a first air gap; a second prism which extracts a predetermined wavelength component; a second air gap; and third and fourth prisms that are joined to each other, wherein, in particular, a light reflected by the joint plane is totally reflected by a surface adjacent the second air gap and guided to an image pickup device.

13 Claims, 9 Drawing Sheets

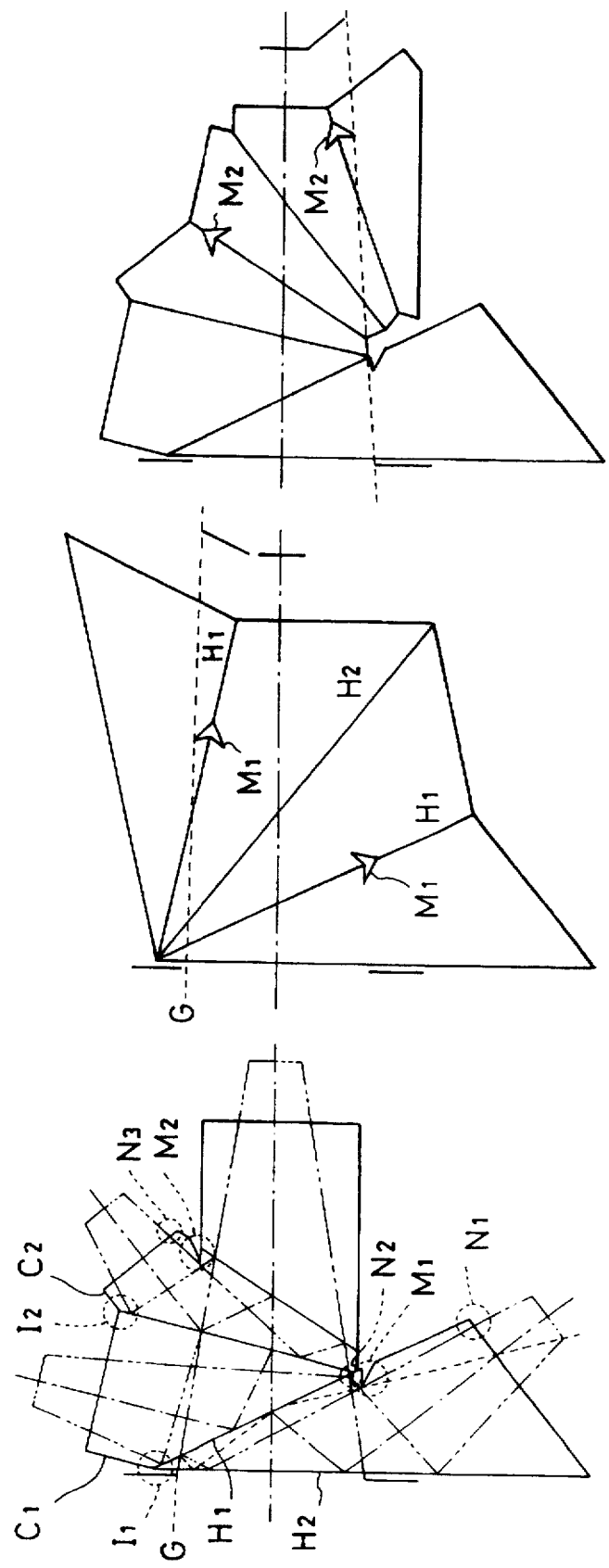

1

FOUR COLOR SEPARATION OPTICAL DEVICE

BACKGROUND OF THE INVENTION

1. Field of the Invention

The present invention relates to a color separation prism for color television cameras and, in particular, to a color separation optical system which is positioned between an objective for picture taking and the focal plane of this objective and which separates light from the objective into four luminous fluxes, guiding each luminous flux to an image pickup device.

2. Description of the Related Art

In color television cameras, a color separation optical system for separating the light from the objective into the three primary colors of light, i.e., blue, green and red, is provided between the objective and the image pickup device. The image pickup device comprises an image pickup tube, a solid-state image sensing device or the like. Nowadays, it is common practice to use a solid-state image sensing device as the image pickup device.

The color separation optical system uses a plurality of prisms having predetermined configurations. These prisms are combined in a predetermined relationship to form an integral unit. The luminous flux entering the system through the objective is separated into three luminous fluxes respectively corresponding to the three primary colors as it passes through the prisms, and the three luminous fluxes are guided to predetermined image pickup devices.

FIG. 7 is a schematic diagram showing a conventional color separation optical system having three prisms. In the drawing, numeral 101 indicates a color separation optical system; numeral 102 indicates a blue component separating prism; and numeral 103 indicates a red component separating prism having a surface of incidence 103a arranged adjacent to the blue component separating prism 102 through the intermediation of a minute air gap. Numeral 104 indicates a green component separating prism having a surface of incidence 104a joined to a surface of incidence 103b of the red component separating prism 103.

In the drawing, blue light B of the luminous flux from the objective Le is reflected by a reflection surface 102b of the blue component separating prism 102. The reflection surface 102b is covered with a dielectric multi-layered film. The blue light B is totally reflected by the surface of incidence 102a, and then emitted through a surface 102c before it is received by a solid-state image sensing device 105B arranged opposite to the surface 102c. Red light R is separated by the reflection surface 103b of the red component separating prism 103. The reflection surface 103b is covered with a dielectric multi-layered film. The red light R is totally reflected by the surface of incidence 103a, and then emitted through a surface 103c before it is received by a solid-state image sensing device 105R arranged opposite to the surface 103c. The remaining luminous-flux portion, i.e., green light G, is transmitted through the above-mentioned reflection surfaces 102b and 103b and then through a prism 104, and emitted through a surface 104c before it is received by a solid-state image sensing device 105G arranged opposite to the surface 104c.

Nowadays, to obtain a television camera of a higher performance, there is an increasing demand for separation of the luminous flux from the lens into four luminous-flux portions.

For example, while a three-channel system of B, G and R images as described above has conventionally been used, there has also been made an attempt to adopt a four-channel system of $G_1$, $G_2$, B and R images, i.e., a system in which the G image in the three-channel system is sub-divided into two images, to thereby effect a ½ pixel shift with the two solid-state image sensing devices for taking the $G_1$ and $G_2$ images, thereby realizing a television camera having an improved resolution.

In another attempt, a four-color separation optical system is used in which, in addition to the three channels of B, G and R primary color images, an infrared-region channel is provided to thereby realize a television camera for image analysis. Further, it has also been attempted to provide a luminance channel to thereby achieve a further improvement in color reproducibility.

Generally speaking, however, the larger the number of channels, the larger the number of requisite risms, resulting in an increase in the size of the optical system. German Patent Laid-Open No. 1462828 discloses a color separation prism device in which five or more prisms are combined to effect separation of light into four channels. The device disclosed in the above-mentioned German patent laid-open has a problem in that an additional separation prism is arranged in front of the conventional three-color separation prisms, with the result that the optical system increases in size, thereby making it impossible for the system to employ an objective as has been conventionally used.

Japanese Patent Laid-Open No. 59-117884 discloses a method according to which the third prism in the conventional three-prism color separation optical system is divided by a half-mirror surface that is inclined with respect to the optical axis, thereby extracting G images in two directions.

The method of the above-mentioned Japanese patent laid-open has a problem in that the G image reflected by the half mirror is reflected an odd number of times, with the result that, unlike the images of the other channels, which can be extracted after being reflected an even number of times, the resultant G image is inverted from top to bottom (or left to right).

SUMMARY OF THE INVENTION

The present invention has been made in view of the above problems in the prior art. A first object of the present invention is to provide a small-sized four-color separation prism. A second object of the present invention is to provide a color separation prism having a glass length that is substantially equivalent to that of the conventional three-color separation prism, thereby making it possible to maintain compatibility of the objective with conventional objectives. A third object of the present invention is to provide a four-color-separation prism involving no image inversion. A fourth object of the present invention is to provide a television camera which is equipped with such a color separation prism which helps to attain an improvement in resolution.

In accordance with the present invention, there is provided a color separation optical system for effecting color separation on a light from an objective. The present invention also provides a television camera equipped with such a color separation optical system. The color separation optical system of the present invention comprises, in an arrangement in the order according to the direction in which the light from the associated objective travels: a first prism which has a predetermined apex angle and which serves to extract a predetermined wavelength component; a first air gap; a second prism having a predetermined apex angle; a second air gap; a third prism having a predetermined apex angle; and a fourth prism.

In particular, that surface of the first prism which is in contact with the first air gap is covered with an optical thin film having a wavelength selectivity. Further, that surface of the second prism which is in contact with the second air gap is covered with an optical thin film having a wavelength selectivity.

Further, the third and fourth prisms are joined to each other through the intermediation of a joint plane, which is a semi-transmissive plane, and the light reflected by this semi-transmissive plane is totally reflected by the second air gap, whereby a color separation prism is provided which involves no image inversion.

Further structural features of the color separation prism of the present invention will be described with reference to the following embodiments.

BRIEF DESCRIPTION OF THE DRAWINGS

FIGS. 2(A) through 2(C) are sectional views and developments of a color separation prism according to a first numerical embodiment of the present invention;

DESCRIPTION OF THE PREFERRED EMBODIMENTS

Figure 1:
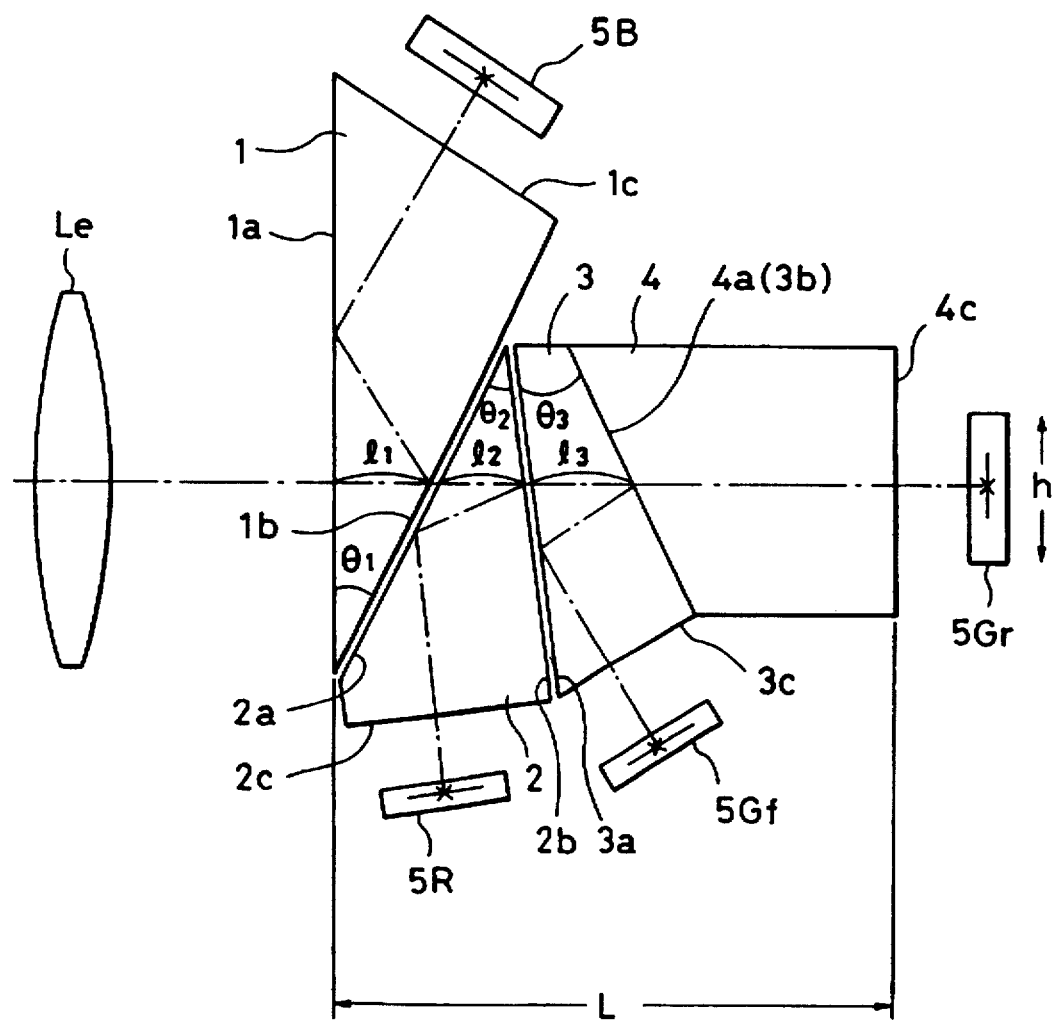
FIG. 1 is a sectional view illustrating the main portions of a color separation optical system according to the present invention.

FIG. 1 is a sectional view illustrating the main portions of a color separation optical system according to the present invention, which may be provided in the body of a television camera. In the drawing, symbol Le indicates an objective, which actually comprises a plurality of lenses, although it is presented here as a single lens for convenience's sake. Numeral 1 indicates a first prism for separating a blue component. The first prism 1 has a reflection surface 1b on which a dielectric multi-layered film that has a wavelength selectivity is formed by evaporation. Numeral 2 indicates a second prism for separating a red component. The second prism 2 has a surface of incidence 2a arranged adjacent to the reflection surface 1b of the blue component separating prism 1 through the intermediation of a minute gap (a first air gap). The second prism 2 is further equipped with a reflection surface 2b on which a dielectric multi-layered film that has a wavelength selectivity is formed by evaporation. Numeral 3 indicates a third prism for separating a first green component. The third prism 3 has a surface of incidence 3a arranged adjacent to the reflection surface 2b of the red component separating prism 2 through the intermediation of a minute gap (a second air gap). The third prism 3 is further equipped with a reflection surface 3b (4a) on which is provided at least a coating that serves as a half mirror for separating a light in the green wavelength range into two substantially equal portions, one of which is transmitted and the other reflected. This coating consists, for example, of a dielectric multi-layered film or a metal half mirror. Numeral 4 indicates a fourth (and the last) prism having a surface of incidence 4a joined to the reflection surface 3b of the prism 3 for separating the first green component.

In the drawing, a luminous flux from the objective Le impinges upon the surface of incidence 1a of the blue component separating prism 1. A blue component of this luminous flux is first reflected by the reflection surface 1b of the blue component separating prism 1 and then undergoes total reflection again at the surface of incidence 1a before it is emitted from the emission surface 1c. The blue luminous flux thus emitted forms an image on an image pickup device 5B arranged opposite to the emission surface 1c, whereby a blue image is taken.

Of the portion of light that has been transmitted through the blue component separating prism 1, a red component is first reflected by the reflection surface 2b of the red component separating prism and then undergoes total reflection again at the surface of incidence 2a before it is emitted from the emission surface 2c. The red luminous flux thus emitted forms an image on an image pickup device 5R arranged opposite to the emission surface 2c, whereby a red image is taken.

Of the portion of light that has been transmitted through the red component separating prism 2, a green component, which is reflected substantially by half by the reflection surface 3b of the prism 3 for separating the first green component, undergoes total reflection at the surface of incidence 3a before it is emitted from the emission surface 3c. The green luminous flux thus emitted forms an image on an image pickup device 5Gf arranged opposite to the emission surface 3c, whereby a first green image is taken.

The remaining portion of light, which is a second green luminous flux, is transmitted through the fourth, i.e., the last, prism 4 and emitted from an emission surface 4c to form an image on an image pickup device 5Gr arranged opposite to the emission surface 4c, whereby a second green image is taken. Each of the image pickup devices 5Gf and 5Gr is respectively in a half-pixel arrangement. The respective outer peripheries of the two air gaps are filled with a relatively soft adhesive or the like, thereby sealing the air gaps against intrusion of dust, etc.

In this embodiment, it is desirable that each prism be formed as specified below in order to provide a color separation prism whose total optical length is small enough for a conventional objective to be compatible with the system.

Assuming that symbol h indicates the effective image taking dimension within a plane including the emission luminous flux, which is in the effective image taking range of the image pickup device of this embodiment, each prism dimension is determined so as to satisfy the following conditions:

$$0.95 < \frac{l_1}{h} < 1.3$$

-continued $$0.75 < \frac{l_2}{h} < 1.3$$

$$0.4 \leq \frac{l_3}{l_1 + l_2} \leq 0.6$$

$$5.5 \leq \frac{L}{h} \leq 7.5$$

where $l_1$, $l_2$ and $l_3$: the lengths in the optical axis of the objective of the first, second and third prisms; and L: the length in the optical axis of the objective of the luminous flux separation prism.

The extreme values in the conditional expressions will be explained with reference the description of the embodiment below.

Figure 8:
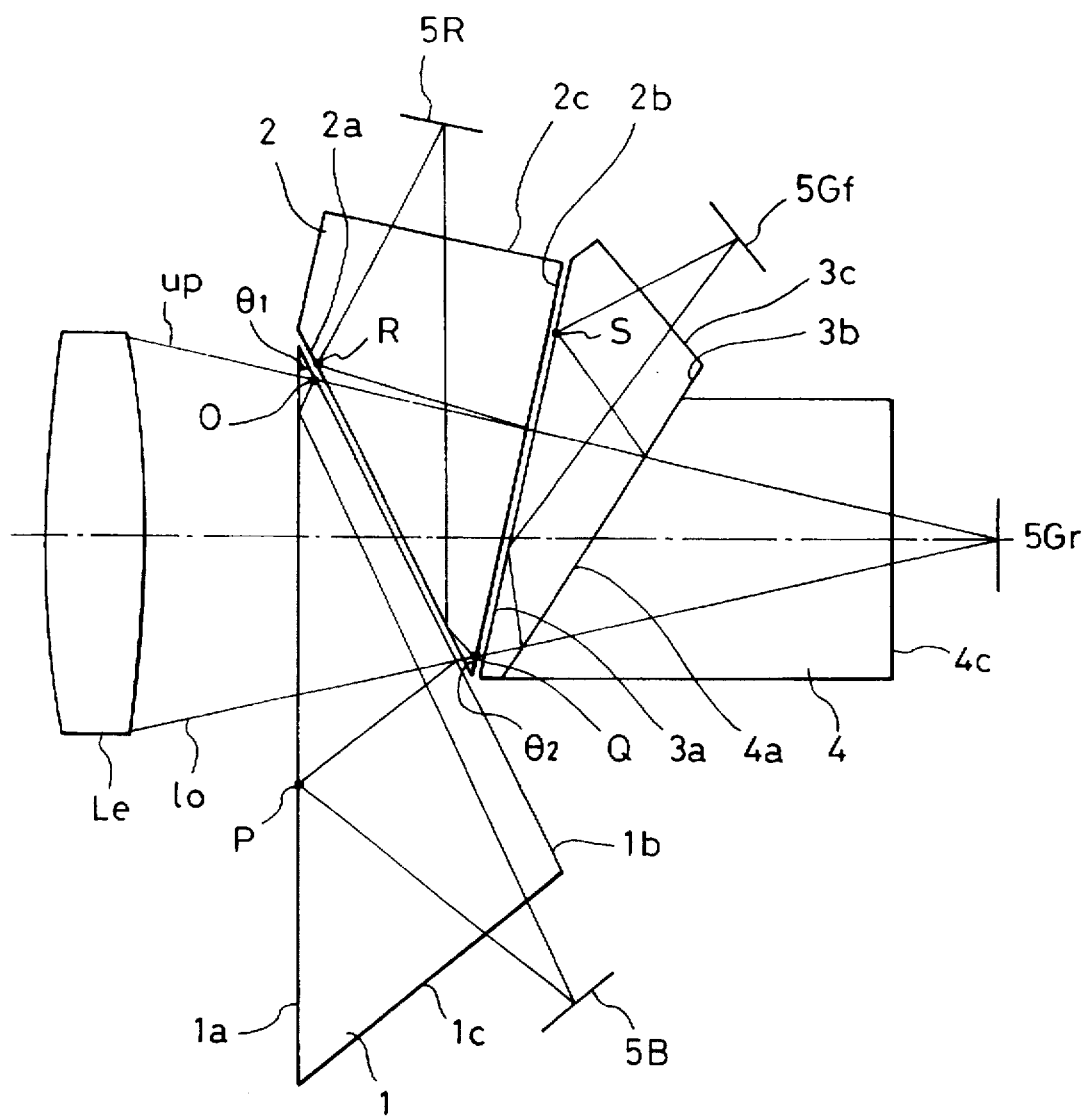
FIG. 8 is a diagram illustrating the total reflection conditions for each prism.

Next, the total reflection conditions for each prism will be explained with reference to FIG. 8. FIG. 8 shows the same basic construction as that shown in FIG. 1 except that it is reverse from top to bottom as compared with FIG. 1.

Symbols up and lo respectively indicate the uppermost and lowermost rays of light forming the luminous flux from the objective Le. A prism must satisfy two conditions before it can be totally reflected. For example, in the case of the first prism 1, the first condition is that the ray of light up, which impinges upon the reflection surface 1b at the point O, must not undergo total reflection at the point O before a part of the energy of this ray of light can be selectively reflected by the dielectric multi-layered film, with the remaining portion of the ray of light being allowed to be transmitted. The second condition is that the ray of light $l_o$, which impinges upon the surface of incidence 1a at the point P after having been partly reflected by the reflection surface 1b, must undergo total refection before the light energy can be efficiently guided to the image pickup device 5B. The two total reflection conditions in the first prism can be expressed as follows:

$$\theta_1 < \delta - \theta_{max} \quad \text{(a)}$$

$$\frac{\delta + \theta_{max}}{2} < \theta_1 \quad \text{(b)}$$

where $\theta_1$: the apex angle of the first prism $$\delta = \sin^{-1}\left(\frac{1}{n}\right) \quad \text{(c)}$$

$$\theta_{max} = \sin^{-1}\left(\frac{1}{2 \times n \times Fno}\right) \quad \text{(d)}$$

where $F_{no}$: the minimum F number that allows transmission through the color separation optical system; and n: the refractive index of the prism. Similarly, the total reflection conditions at the points Q, R and S in the second and third prisms can be expressed as follows:

$$\theta_2 < \theta_1 + \delta - \theta_{max} \quad \text{(e)}$$

$$\frac{\theta_1 + \delta + \theta_{max}}{2} < \theta_2 \quad \text{(f)}$$

$$\frac{-\theta_2 + \theta_1 + \delta + \theta_{max}}{2} < \theta_3 \quad \text{(g)}$$

where $\theta_2$ and $\theta_3$: the apex angles of the second and third prisms.

In accordance with this embodiment, a color separation prism basically formed as specified above is endowed with the following conditions:

$$1.4 \leq Fno \leq 1.8 \quad (1)$$

$$1.6 \leq n \leq 1.8 \quad (2)$$

$$20.8° < \theta_1 < 29.2° \quad (3)$$

$$-0.5° < \theta_2 - \frac{\theta_1 + \delta + \theta_{max}}{2} < 5.5° \quad (4)$$

$$-0.5° < \theta_3 - \frac{-\theta_2 + \theta_1 + \delta + \theta_{max}}{2} < 4.5° \quad (5)$$

where $F_{no}$: the minimum F number that allows transmission through the color separation optical system;

n: the refractive index of the prism;

n': the refractive index of the adhesive; and $\theta_1$, $\theta_2$ and $\theta_3$: the apex angles of the first, second and third prisms. Due to this arrangement, it is possible to maintain the compatibility of the system with objectives as used in cameras using a conventional three-color separation prism. Further, a bright four-color separation prism having a small F number is realized.

Next, the above conditional expressions will be explained.

Formula (1) defines an F number of the lens that allows transmission through the color separation prism.

Japanese Patent Laid-Open No. 60-4272, which discloses a color separation optical system using three prisms, indicates that approximately 1.4 is the limit for the F number regarding total reflection of the luminous flux. The minimum F number that is capable of simultaneously satisfying the above formulas (a) and (b) is 1.4. If 1.8< $F_{no}$, the maximum camera sensitivity is deteriorated as compared with that of conventional cameras, which is not acceptable from the viewpoint of the object of the present invention.

Formula (2) defines the refractive index of the glass forming the prism. If n<1.6, the size of the prism is excessively large, so that it is difficult to maintain the compatibility with conventional lenses. If n<1.8, the difference in refractive index between the prism and the optical coating, which is applied to the prism portions other than the effective luminous flux section thereof for the purpose of restraining the flare due to the scattering of light impinging upon prism side surfaces, beveled sections, light-shielding grooves, etc., becomes excessively large, thereby making it difficult to restrain the flare.

Formula (3) defines the condition regarding angle range that the apex angle $\theta_1$ of the first prism must satisfy under the conditions of formulas (1) and (2). However, for the reasons stated below, a wide permissible range of ±0.5° is provided for the angle range that can be obtained from the above formulas (a) and (b).

Figure 9:
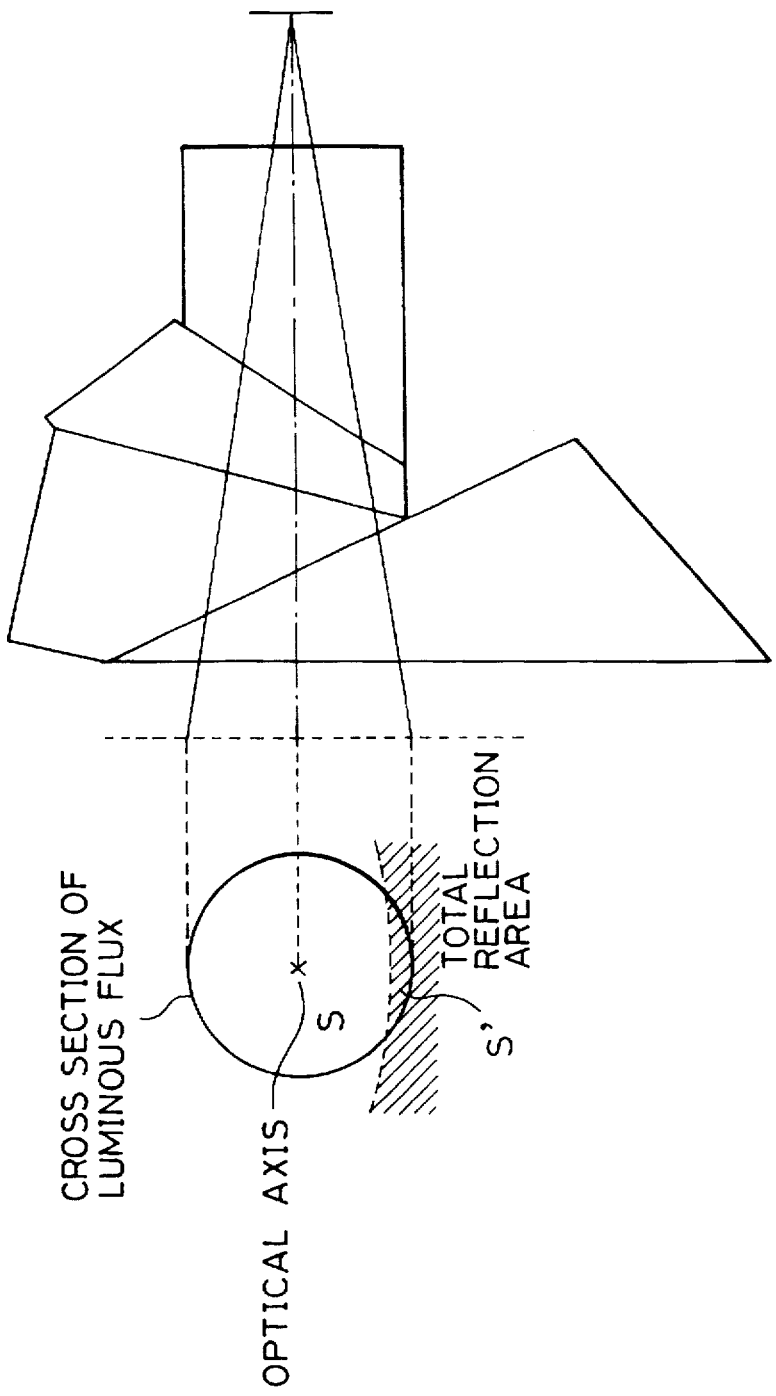
FIG. 9 is a diagram showing a cross section of a luminous flux transmitted through a prism according to the present invention.

FIG. 9 is a sectional view of the central luminous flux of a lens, taken at a position spaced apart from the image formation surface. If the range defined by the formulas (a) and (b) is exceeded by 0.5°, the only luminous flux that does not satisfy the total reflection conditions is the shaded arcuate section S' in FIG. 9, which section corresponds to 1% or less in terms of light quantity with respect to the total luminous flux S, so that it is negligible from the practical point of view.

Similarly, the following conditions are defined with respect to the second and third prisms.

Conditional formula (4) defines the optimum range for the apex angle $\theta_2$ of the second prism.

The upper and lower limits of $\theta_2$ must satisfy the formulas (e) and (f), respectively. The present inventor has found that, to reduce the size of the prism in order to maintain the compatibility with conventional lenses, it is only the range that is very close to the lower-limit formula (f) that is permissible; it must be in the range:

$$-0.5° < \theta_2 - \frac{\theta_1 + \delta + \theta_{max}}{2} < 5.5°$$

The lower limit is set 0.5° lower than that as defined by the conditional formula for total reflection (f). If this range is exceeded, it is impossible to satisfy the F number to a degree which is acceptable from the practical viewpoint. The upper limit is necessary for a reduction in size. If this range is exceeded, the total reflection section (S), where the luminous flux which has been reflected by the selective reflection surface $2b$ of the second prism in FIG. 8 intersects the first air gap surface $2a$, is moved away to the emission-surface side, so that it is difficult to cover the total reflection section with the first prism opposite thereto. Assuming that the total reflection section of the second prism is not covered with the first prism, it is impossible to seal the entire periphery of the air gap, with result that the fogginess due to adhesion of dust, water, etc. cannot be prevented. To cover the total reflection section with the first prism so that the above problem can be avoided, the optical-path length in the prism must be increased, resulting in an increase in the size of the prism.

Conditional formula (5) restricts the apex angle of the third prism to an optimum range. An explanation of this formula will be omitted since it is to be regarded as understandable by applying the explanation of the second prism to the third prism.

(Numerical Embodiments)

In conventional camera prisms of a 8.8×6.6 image taking size (⅔" format in the NTSC system), the length L (which is a parameter representing the size of a prism) of the prism has been in the range of 34 to 39 mm.

In Numerical Embodiments 1 through 3, the effective image taking size h in a plane including the emission luminous flux in a camera prism of this image taking size was 6.6.

Numerical Embodiment 1

$F_{no}$=1.4, n=1.6, n'=1.56

$\theta_{max}$=12.8°, $\delta$=38.7°

$\theta_1$=25.8°, $\theta_2$=38.7°, $\theta_3$=19.3°

$l_1$=7.5, $l_2$=7.6, $l_3$=6.8, L=44.0

The maximum ray height in the plane including the emission luminous flux of the surface of incidence of the prism: 11.8. The distance in terms of air between the emission surface of the prism and the image formation surface (in the unit of mm): 5.

In Numerical Embodiment 1, a prism was realized which is formed of a glass that is relatively inexpensive, satisfactorily workable and easy to select. Thus, a prism having a brightness of $F_{no}$=1.4 was formed of a glass whose n was 1.6. A glass whose n=1.6 has a relatively low level of refractive index, so that $\theta_{max}$ is large and the diameter of the incident luminous flux that the color separation optical system has to receive is larger, thereby making it difficult to attain a reduction in prism size. In this numerical embodiment, however, the increase in the length of the optical path is restrained to approximately 10% as compared to conventional prisms. In the combination of $F_{no}$=1.4 and n=1.6, $\theta_1$ is the only value that satisfies the two total reflection conditions of the first prism. $\theta_2$ and $\theta_3$ are values approximately at the lower limits of the ranges satisfying the total reflection conditions, and the following equations hold true:

$$\theta_2 = \frac{\theta_1 + \delta + \theta_{max}}{2} = +0.1, \theta_3 = \frac{-\theta_2 + \theta_1 + \delta + \theta_{max}}{2} = 0$$

FIG. 2 is a sectional view of a prism in accordance with Numerical Embodiment 1. In this embodiment, $l_1/h$ is approximately equal to 1.14.

When $l_1$ diminishes, it becomes difficult to maintain the section $N_1$ in FIG. 2(A), that is, the effective portion of the emission surface in the first prism. Conversely, when $l_1$ increases, the position of the emission surface of the second prism approaches the optical axis of the objective, so that it becomes impossible to secure the total reflection area of the section $I_2$.

In this embodiment, $l_2/h$ is approximately equal to 1.15.

When $l_2$ increases, it becomes difficult to secure the total reflection area indicated by the section $I_1$ in the drawing. On the other hand, when $l_2$ diminishes, it becomes difficult to secure the luminous-flux effective section indicated by the section $N_2$ in the drawing. Further, in this embodiment, $$\frac{l_3}{l_1 + l_2} = 0.45$$

When this value increases, the total reflection area of the section $I_2$ cannot be secured, so that it becomes difficult to secure the luminous-flux effective portion of the section $N_3$.

A groove $M_1$ provided in the first prism and a groove $M_2$ provided in the third prism are grooves for ghost cutting. In the drawing, the two beams crossing each other in the grooves $M_1$ and $M_2$ (indicated by two-dot chain lines) are beams in the outermost sections of the effective luminous flux, so that these grooves are arranged such that the forward ends thereof are situated at the point of intersection. Due to this arrangement, it is possible to prevent ghosts most effectively.

Portions (B) and (C) of FIG. 2 are developments obtained by folding back the sectional view of portion (A) on the planes where the light is reflected. For example, the development of portion (B) of FIG. 2 is obtained by developing the optical path for a ghost ray of light which undergoes reflection successively in the order: surface $H_1$-surface $H_2$-surface $H_1$ in portion (A) (indicated by the broken line G) before it impinges upon the image taking surface. By drawing such developments, it is possible to consider the ray of light reflected in the prism as a single linear line. By arranging grooves at positions as mentioned above, the image taking surface is hidden behind the grooves from the ghost light indicated by broken lines in portions (B) and (C) of FIG. 2, so that it is possible to prevent ghosts.

Further, chamfered sections $C_1$ and $C_2$ are formed in the apex sections formed by the incidence and emission surfaces of the second and third prisms. These two chamfered sections protrude from the chamfered prisms beyond the prisms on the lens side, and serve to prevent interference with structures (not shown) between the prism and the objective, structures required for fastening the CCD, etc., thereby contributing to a reduction in size. Due to this arrangement, a value of L of 44.0 could be realized, which was an increase of somewhat larger than 10% as compared with that of conventional prisms in spite of the fact that it was a bright prism having an $F_{no}$ of 1.4. Here, L/h is approximately equal to 6.7.

Numerical Embodiment 2

$F_{no}$=1.8, n=1.8, $\theta_{max}$=8.8°, $\delta$=33.7°

$\theta_1$=24.8°, $\theta_2$=38.5°, $\theta_3$=18.5°

$l_1=7.0$, $l_2=5.5$, $l_3=6.2$, $L=37.0$

The maximum ray height in the plane including the emission luminous flux of the surface of incidence of the prism: 7.1. The distance in terms of air between the emission surface of the prism and the image formation surface: 5.

In Numerical Embodiment 2, a glass having a high refractive index was used, thereby realizing a compact color separation optical system.

By restricting the $F_{no}$ to 1.8 and adopting a high-refractive-index glass of n=1.8, the value of $\theta_{max}$ diminishes, and the diameter of the incident luminous flux that the color separation optical system has to deal with can be small, thereby achieving a reduction in prism size.

Figure 3A:
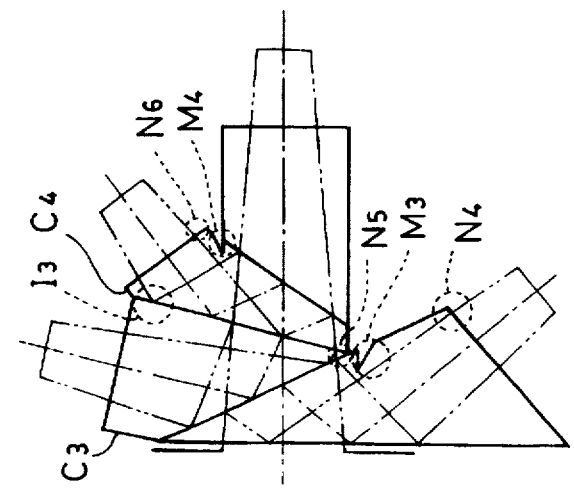
FIGS. 3(A) through 3(C) are a sectional view and developments of a color separation prism according to a second numerical embodiment of the present invention.
Figure 3B:
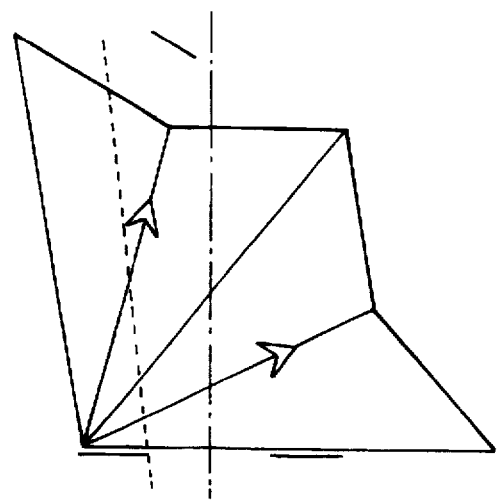
Figure 3C:
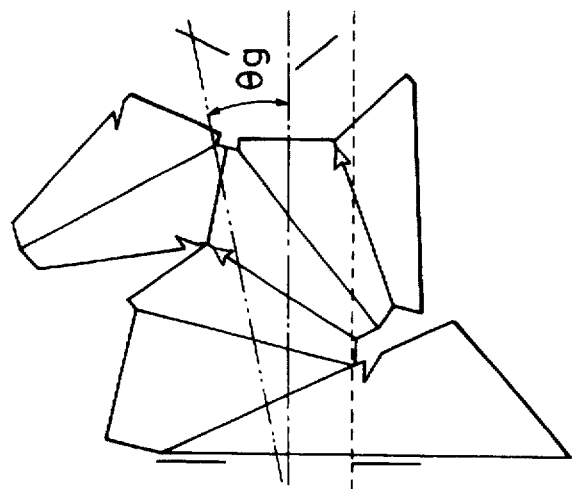

FIG. 3 is a sectional view of a prism in accordance with Numerical Embodiment 2. The values of $\theta_1$, $\theta_2$, $\theta_3$, $l_1$, $l_2$, and $l_3$ were determined such that the ghost indicated by the broken lines in FIGS. 3(B) and 3(C) could be avoided by the grooves in the sections $M_3$ and $M_4$ while securing the total reflection area in the section $I_3$ and the luminous-flux effective portions in the sections $N_3$ and $N_4$.

$$\theta_2 - \frac{\theta_1 + \delta + \theta_{max}}{2} = +4.9, \text{ and } \theta_3 - \frac{-\theta_2 + \theta_1 + \delta + \theta_{max}}{2} = +4.1.$$

When the values of $\theta_2$ and $\theta_3$ increase excessively, it becomes difficult to secure the total reflection area in the section $I_3$.

$l_1/h$ is approximately 1.06, and $l_2/h$ is approximately 0.83. A reduction in the value of $l_1$ makes it difficult to secure the effective portion of the emission surface in the section $N_4$ in the drawing. An increase in the value of $l_1$ results in the emission surface of the second prism approaching the optical axis of the objective, thereby making it difficult to secure the total reflection area in the section $I_3$ in the drawing. An increase in the value of $l_2$ results in the emission surface of the second prism approaching the optical axis of the objective, thereby making it impossible to secure the total reflection area in the section $I_3$ in the drawing. A reduction in the value of $l_2$ makes it impossible to secure the luminous-flux-effective portion of the section $N_5$ in the drawing.

$$\frac{l_3}{l_1 + l_2} = 0.50$$

An increase in this value makes it impossible to secure the total reflection area in the section $I_3$, and a reduction in this value makes it impossible to secure the luminous-flux effective portion of the section $N_6$.

The grooves of the sections $M_3$ and $M_4$ are arranged such that the respective forward ends of the grooves are situated at a point 1 mm spaced apart from two beams (two-dot chain lines) which intersect each other in each of the sections $M_3$ and $M_4$ in FIG. 3(A). Due to the arrangement of these grooves, the image taking surface is hidden behind the grooves from the ghost rays indicated by the broken lines of FIGS. 3(B) and 3(C), thereby making it possible to prevent ghosts. Further, chamfered sections $C_3$ and $C_4$ are formed in the apex sections formed by the incidence and emission surfaces of the second and third prisms. In particular, the chamfered section $C_4$ has a function by which it helps to avoid interference and prevents ghost indicated by the broken line in FIG. 3(C). Thus, it is indispensable in attaining a reduction in size while preventing ghosts. Generally speaking, television-camera lenses are designed as lenses that are close to telecentric lenses, so that the rays of light emitted from the lenses include no ray of light having an angle that is larger than the maximum ray angle $\theta_{max}$, which is determined by the exposure F number. The section $C_4$ serves to block those rays of light in the ghost optical path indicated by the broken line whose angle is smaller than $\theta_{max}$, thereby preventing intrusion of ghost light onto the image taking surface. In FIG. 3(C), symbol $\theta_g$ indicates the minimum angle of ghost light transmitted through the prism and indicated by two-dot line. In this embodiment, the angle is 11.9°. Seeing that the maximum ray angle $\theta_{max}$ of the ray of light from a lens satisfying the telecentric conditions and having an F number of 1.8 is 8.8°, it will be understood that the value of $\theta_g$ is large enough to make it possible to prevent ghosts.

In this way, an L value of 37.0, which is equivalent to that of conventional prisms, could be realized despite the value of $F_{no}$ of 1.8, which means the sufficient brightness of the prism is maintained.

The value of L/h is approximately 5.6.

Numerical Embodiment 3

$F_{no}=1.5$, $n=1.6$,
$\theta_{max}=12.0°$, $\delta=38.7°$
$\theta_1=25.4°$, $\theta_2=38.0°$, $\theta_3=19.0°$
$l_1=8.2$, $l_2=7.0$, $l_3=7.8$, $L=44.0$ The maximum ray height in the plane including the emission luminous flux of the surface of incidence of the prism: $l_1$. 1. The distance in terms of air between the emission surface of the prism and the image formation surface: 5.

FIG. 4 is a sectional view of a prism in accordance with Numerical Embodiment 3, in which a flat parallel glass that is separate from the prism can be arranged on the emission surface of the second prism. The thickness of the parallel flat glass in this numerical embodiment is 1 mm. The flat parallel glass is provided so as to be used as a trimming filter for correcting and shaping the spectral characteristics of the prism. Further, it may also be used as a λ/4 plate for correcting the polarized light received in the prism or as a low-pass filter for preventing aliasing. Naturally, a dummy glass for thickness correction suffices when no such flat parallel glass is used. It is naturally also possible to form it integrally with the prism.

$$\theta_2 - \frac{\theta_1 + \delta + \theta_{max}}{2} = -0.1, \text{ and } \theta_3 - \frac{-\theta_2 + \theta_1 + \delta + \theta_{max}}{2} = -0.1.$$

When the values of $\theta_2$ and $\theta_3$ increase, it becomes impossible to secure the total reflection area in the section $I_4$. $l_1/h$ is approximately 1.24, and L is approximately 1.06.

A reduction in the value of $l_1$ makes it difficult to secure the effective portion of the emission surface in the section $N_7$ in the drawing. An increase in the value of $l_1$ results in the emission surface of the second prism approaching the optical axis of the objective, thereby making it impossible to secure the total reflection area in the section $I_4$ in the drawing. An increase in the value of $l_2$ results in the emission surface of the second prism approaching the optical axis of the objective, thereby making it impossible to secure the total reflection area in the section $I_4$ in the drawing. A reduction in the value of $l_2$ makes it impossible to secure the luminous-flux effective portion in the section $N_8$ in the drawing.

$$\frac{l_1}{l_1 + l_2} = 0.51$$

An increase in this value makes it impossible to secure the total reflection area in the section $I_4$.

Figure 4A:
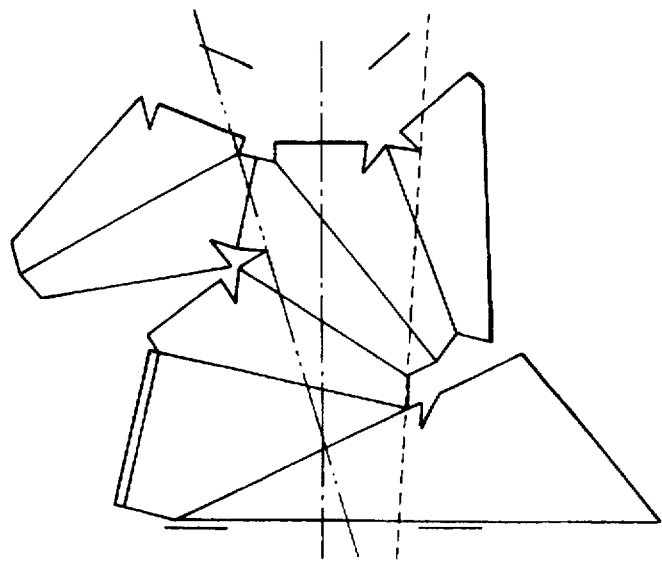
FIGS. 4(A) through 4(C) are a sectional view and developments of a color separation prism according to a third numerical embodiment of the present invention.
Figure 4B:
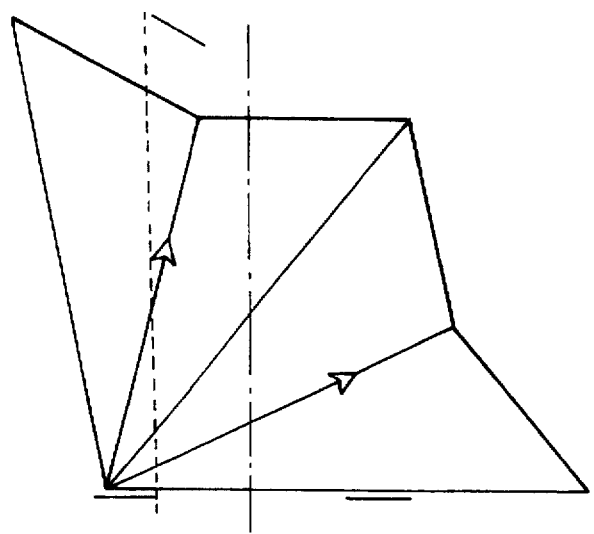
Figure 4C:
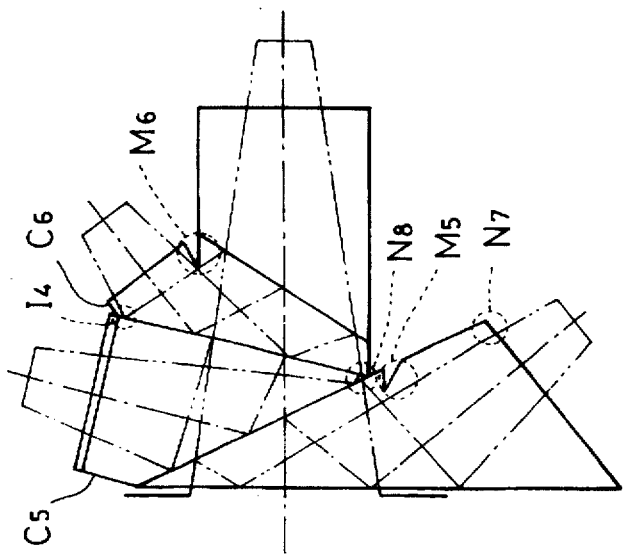

The groove of the section $M_5$ is arranged such that the forward end of the groove is situated at a point 1 mm spaced apart from two beams (two-dot chain lines) crossing each other in the section $M_5$, in FIG. 4(A). The groove of the section $M_6$ is arranged such that the forward end of the groove is situated at the point of intersection of two beams (two-dot chain lines) crossing each other in the section $M_6$. Due to the arrangement of these grooves, the image taking surface is hidden behind the grooves from the ghost rays indicated by the broken lines of FIGS. 4(B) and 4(C), thereby making it possible to prevent ghosts. When the value of $$\frac{l_3}{l_1 + l_2}$$

diminishes, the effective luminous flux portion near the section $M_6$ approaches the outer periphery of the third prism, thereby making it necessary to reduce the depth of the grooves. Therefore, the image taking surface cannot be hidden behind the grooves from the ghost light indicated by the broken line, thereby making it impossible to avoid ghost light. Further, chamfered sections $C_5$ and $C_6$ are formed in the apex sections formed by the incidence and emission surfaces of the second and third prisms. The chamfered section C6 has a function by which it helps to avoid mechanical interference and prevent ghosts indicated by the two-dot chain line in FIG. 4(C). The minimum angle of the ghost light in this embodiment is 16.3°, and, seeing that the maximum ray angle $\theta_{max}$ of the ray of light from a lens having a telecentric characteristic and an F number of 1.5 is 12.0°, it will be understood that it is possible to prevent ghosts.

In this way, an L value of 44.0 (The value of L/h is approximately 6.7) could be realized, which is an increase by 10% as compared to conventional prisms, despite the value of $F_{no}$ of 1.5, which means the prism is a bright one.

Numerical Embodiments 4 to 5 are embodiments of a prism for cameras having an image taking size of 9.6×5.4 (of a ⅔" aspect ratio of 16:9 as in the case of high vision). The length L of conventional prisms ranges from 32 to 36 mm.

Numerical Embodiment 4

$F_{no}=1.4$, n=1.6, n'=1.56

$\theta_{max}=12.8°$, $\delta=38.7°$ $\theta_1=25.8°$, $\theta_2=38.7°$, $\theta_3=19.3°$ $l_1=6.7$, $l_2=6.7$, $l_3=6.7$, L=39.0

The maximum ray height in the plane including the emission luminous flux of the surface of incidence of the prism: 11.8. The distance in terms of air between the emission surface of the prism and the image formation surface: 5.

As in Numerical Embodiment 1, in Numerical Embodiment 4, a prism having a brightness of $F_{no}=1.4$ is realized by using a glass of n=1.6 that is easy to select. Despite the conditions that would not easily allow a reduction in size, the increase in optical path length in this embodiment is restrained to approximately 10% as compared to conventional prisms. $\theta_1$ is the only value that satisfies the two total reflection conditions in the combination of $F_{no}=1.4$ and n=1.6. $\theta_2$ and $\theta_3$ are values substantially at the lower limit satisfying the respective total reflection conditions.

$$\theta_2 - \frac{\theta_1 + \delta + \theta_{max}}{2} = +0.1, \text{ and } \theta_3 - \frac{-\theta_2 + \theta_1 + \delta + \theta_{max}}{2} = 0.$$

Figure 5A:
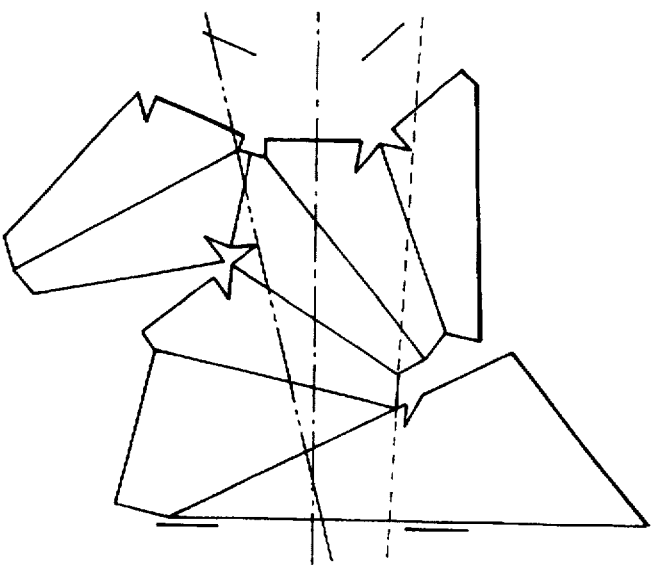
FIGS. 5(A) through 5(C) are sectional views and developments of a color separation prism according to a fourth numerical embodiment of the present invention.

FIG. 5 is a sectional view of a prism in accordance with Numerical Embodiment 4. $l_1/h$ is approximately 1.24. A reduction in the value of $l_1$ makes it impossible to secure the effective portion of the emission surface in the section $N_9$ in FIG. 5(A). An increase in the value of $l_1$ results in the emission surface of the second prism approaching the optical axis of the objective, thereby making it impossible to secure the total reflection area of the section $I_6$. $l_2/h$ is approximately 1.15. An increase in the value of $l_2$ makes it impossible to secure the total reflection area of the section $I_5$ in the drawing. A reduction in the value of $l_2$ makes it impossible to secure the luminous-flux effective portion of the section $N_9$ in the drawing.

$$\frac{l_3}{l_1 + l_2} = 0.45$$

An increase in this value makes it impossible to secure the total reflection area of the section $I_6$ and a reduction in this value makes it impossible to secure the luminous-flux effective portion of the section $N_{10}$.

Figure 5B:
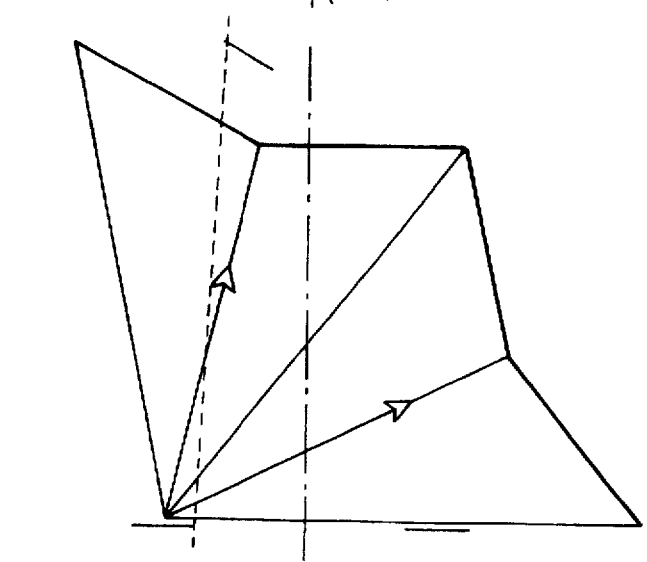
Figure 5C:
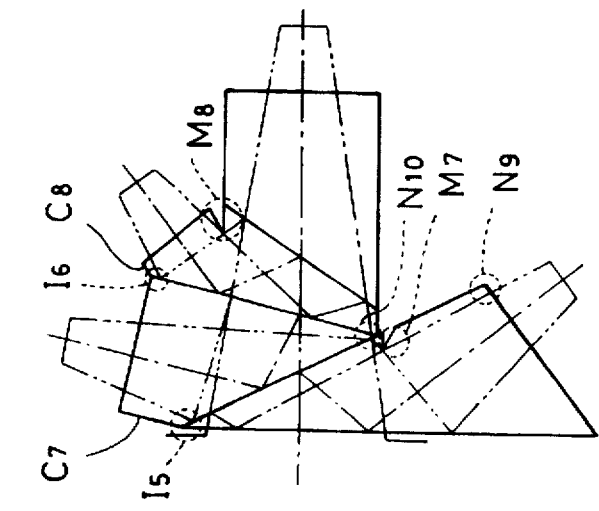

The grooves of the sections $M_7$ and $M_8$ are arranged such that the respective forward ends of the grooves are situated at intersections of two beams (two-dot chain lines) crossing each other in each of the sections $M_7$ and $M_8$. FIGS. 5(B) and 5(C) are developments of FIG. 5(A). Due to the arrangement of these grooves, the image taking surface is hidden behind the grooves from the ghost rays indicated by the broken lines of FIGS. 5(B) and 5(C). Further, chamfered sections $C_7$ and $C_8$ are formed in the apex sections formed by the incidence and emission surfaces of the second and third prisms. In particular, the chamfered section $C_8$ has a function by which it helps to avoid mechanical interference and prevent ghost rays indicated by the two-dot chain line in FIG. 5(C). Further, seeing that the minimum ghost ray angle in this embodiment is 14.30 and that the maximum ray angle $\theta_{max}$ of the ray from the lens having a telecentric characteristic and an F number of 1.4 is 12.8°, it will be understood that ghosts are prevented.

In this way, an L value of 39.0 (The value of L/h is approximately 7.2), which is a 10% increase as compared to conventional prisms, could be realized despite the prism having a brightness corresponding to the $F_{no}$ of 1.4.

Numerical Embodiment 5

$F_{no}=1.8$, n=1.8, n'=1.56

$\theta_{max}=8.8°$, $\delta=33.7°$ $\theta_1=24.8°$, $\theta_2=39.0°$, $\theta_3=18.0°$ $l_1=6.2$, $l_2=5.2$, $l_3=6.2$, L=34.0

The maximum ray height in the plane including the emission luminous flux of the surface of incidence of the prism: 7.1. The distance in terms of air A between the emission surface of the prism and the image formation surface: 5.

As in Numerical Embodiment 2, in Numerical Example 5, a glass having a high refractive index is used, thereby realizing a compact color separation optical system.

Figure 6A:
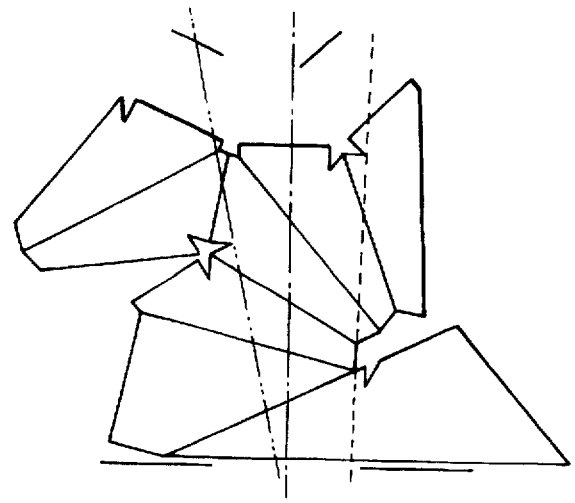
FIGS. 6(A) through 6(C) are sectional views and developments of a color separation prism according to a fifth numerical embodiment of the present invention.
Figure 6B:
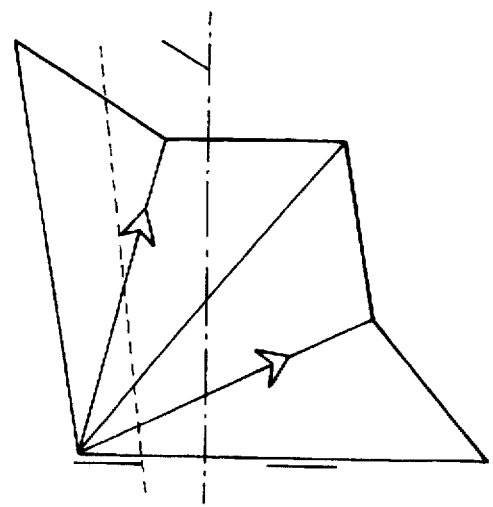
Figure 6C:
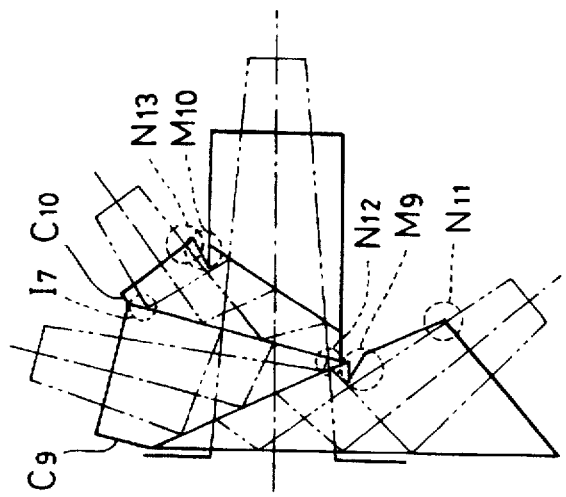
Figure 7:
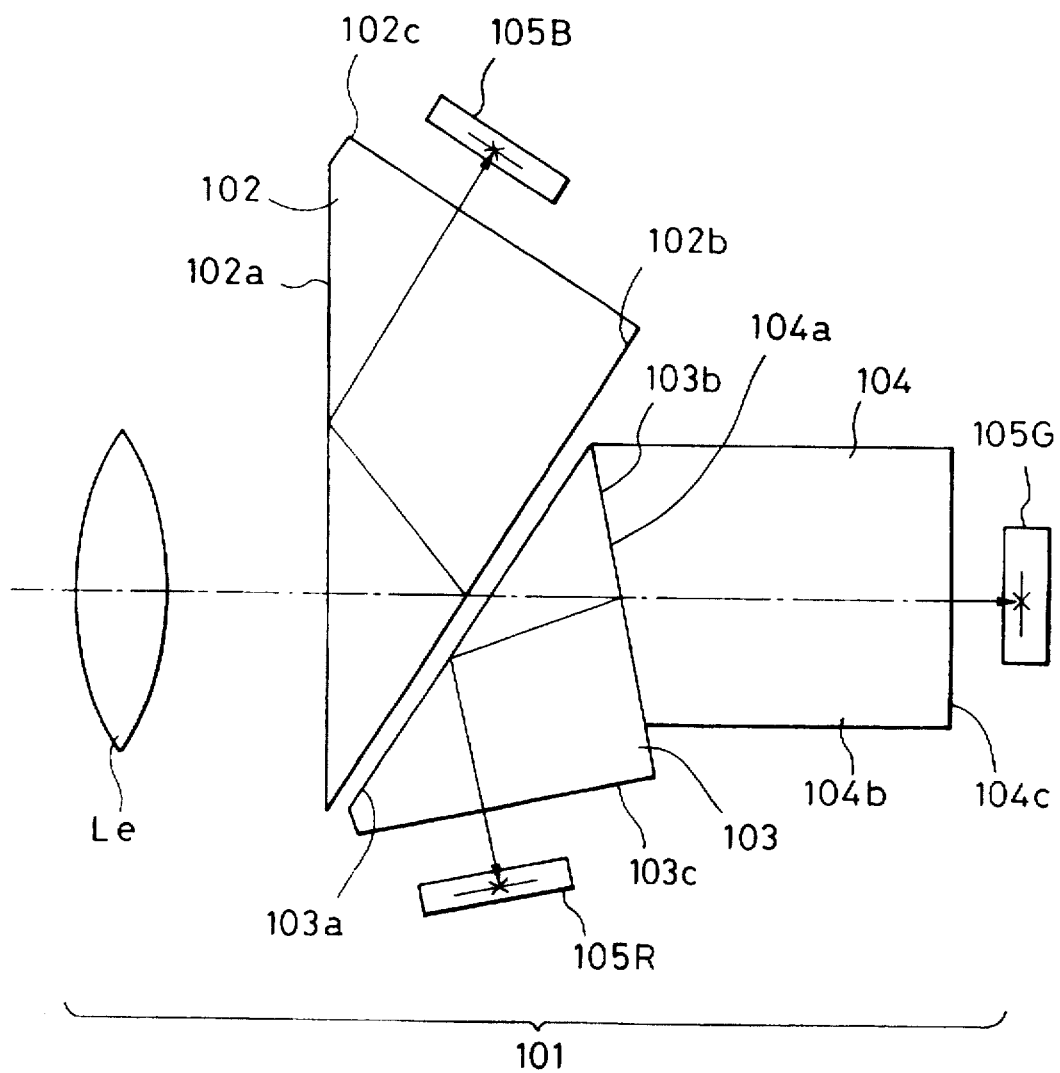
FIG. 7 is a diagram showing a conventional color separation optical system.

FIG. 6 is a sectional view of a prism in accordance with Numerical Embodiment 5. The values of $\theta_1$, $\theta_2$, $\theta_3$, $l_1$, $l_2$, and $l_3$ were determined such that the ghost portions indicated by the broken lines in FIGS. 6(B) and 6(C) could be avoided by the grooves in the sections $M_9$ and $M_{10}$ while securing the total reflection area of the section $L_7$ and the luminous-flux effective portions in the sections $N_{11}$ and $N_{12}$ in FIGS. 6(B) and 6(C).

$$\theta_2 - \frac{\theta_1 + \delta + \theta_{max}}{2} = +5.4, \text{ and } \theta_3 - \frac{-\theta_2 + \theta_1 + \delta + \theta_{max}}{2} = +3.9.$$

When the values of $\theta_2$ and $\theta_3$ increase, it becomes impossible to secure the total reflection area of the section $I_8$. $l_1/h$ is approximately 1.06, and $l_2/h$ is approximately 0.83.

A reduction in the value of $l_1$ makes it impossible to secure the effective portion of the emission surface in the section $N_{11}$ in the drawing. An increase in the value of $l_1$ results in the emission surface of the second prism approaching the optical axis of the objective, thereby making it impossible to secure the total reflection area of the section $L_7$ in the drawing. An increase in the value of $l_2$ results in the emission surface of the second prism approaching the optical axis of the objective, thereby making it impossible to secure the total reflection area of the section $L_7$ in the drawing. A reduction in the value of $l_2$ makes it impossible to secure the luminous-flux effective portion of the emission surface in the section $N_{12}$ in the drawing.

$$\frac{l_3}{l_1 + l_2} = 0.50$$

An increase in this value makes it impossible to secure the total reflection area of the section $L_7$, and a reduction in this value makes it impossible to secure the luminous-flux effective portion of the section $N_{13}$.

The grooves of the sections $M_9$ and $M_{10}$ are arranged such that the respective forward ends of the grooves are situated at a point 1 mm and 0.5 mm, respectively, spaced apart from two beams (two-dot chain lines) crossing each other in each of the sections $M_9$ and $M_{10}$. Due to the arrangement of these grooves, the image taking surface is hidden behind the grooves from the ghost rays indicated by the broken lines of FIGS. 6(B) and 6(C). Further, chamfered sections $C_9$ and $C_{10}$ are formed in the apex sections formed by the incidence and emission surfaces of the second and third prisms. The chamfered section $C_{10}$ has a function by which it helps to avoid mechanical interference and prevent ghosts indicated by the two-dot chain line in FIG. 6(C). The minimum angle of the ghost light in this embodiment is 9.20. Further, seeing that the maximum ray angle $\theta_{max}$ of the ray of light from the lens having a telecentric characteristic and an F number of 1.4 is 8.8°, it will be understood that ghosts are avoided.

In this way, an L value of 37.0 (The value of L/h is approximately 6.3) could be realized despite the value of $F_{no}$ of 1.8, which means the brightness of the prism is maintained.

By using a prism according to the present invention, it is possible to realize an optical system which has an F number that is smaller than 1.8 and providing sufficient brightness and which effects color separation into four luminous fluxes while keeping a prism length that maintains compatibility with conventional lenses.

What is claimed is:

1. A color separation optical system for effecting color separation on light from an objective, said color separation optical system comprising, in an arrangement in the order according to a direction in which the light travels: a first prism which has a predetermined apex angle and which serves to extract a predetermined wavelength component; a first air gap; a second prism having a predetermined apex angle; a second air gap; a third prism having a predetermined apex angle; and a fourth prism, wherein the third and fourth prisms are joined to each other through the intermediation of a joint plane, which is a semi-transmissive plane, the light reflected by this semi-transmissive plane being totally reflected by a surface adjacent to the second air gap of said third prism, and wherein an image taking device is provided in a light emission section of each color separation prism, and wherein, assuming that an effective image taking dimension in a plane including emission luminous flux of an effective image taking range of said image taking device is h, the following conditions are satisfied:

$$0.95 < \frac{l_1}{h} < 1.3$$

$$0.75 < \frac{l_2}{h} < 1.3$$

$$0.4 \leq \frac{l_3}{l_1 + l_2} \leq 0.6$$

$$5.5 \leq \frac{L}{h} \leq 7.5$$

where $l_1$, $l_2$ and $l_3$: respective lengths, in an optical axis of the objective, of the first, second and third prisms; and L: length, in the optical axis of the objective, of a luminous flux separation prism.

2. A color separation optical system according to claim 1, wherein that surface of the first prism which is in contact with the first air gap is covered with an optical thin film having a wavelength selectivity.

3. A color separation optical system according to claim 1, wherein that surface of the second prism which is in contact with the second air gap is covered with an optical thin film having a wavelength selectivity.

4. A color separation optical system according to claim 1, wherein the following conditions are satisfied:

$$1.4 \leq F_{no} \leq 1.8$$

$$1.6 \leq n \leq 1.8$$

$$20.8° < \theta_1 < 29.2°$$

$$-0.5° < \theta_2 - \frac{\theta_1 + \delta + \theta_{max}}{2} < 5.5°$$

$$-0.5° < \theta_3 - \frac{-\theta_2 + \theta_1 + \delta + \theta_{max}}{2} < 4.5°$$

where $F_{no}$: the minimum F number which allows transmission through the color separation optical system;

n: the refractive index of the prism;

$\theta_1$, $\theta_2$ and $\theta_3$: the apex angles of the first, second and third prisms;

$$\delta = \sin^{-1}\left(\frac{1}{n}\right); \text{and}$$

$$\theta_{max} = \sin^{-1}\left(\frac{1}{2 \times n \times F_{no}}\right).$$

5. A color separation optical system according to claim 1, wherein a first groove for blocking a harmful light is provided in the first prism at a position close to the apex angle of the second prism, and wherein a second groove for blocking a harmful light is provided in the third prism at a position close to the joint plane between the third and fourth prisms.

6. A television camera having a color separation optical system for effecting color separation on light from an objective, said color separation optical system comprising, in an arrangement in the order according to an direction in which the light travels: a first prism which has a predetermined apex angle and which serves to extract a predetermined wavelength component; a first air gap; a second prism having a predetermined apex angle; a second air gap; a third prism having a predetermined apex angle; and a fourth prism, wherein the third and fourth prisms are joined to each other through the intermediation of a joint plane, which is a semi-transmissive plane, the light reflected by this semi-transmissive plane being totally reflected by a surface adjacent to the second air gap of said third prism and wherein an image taking device is provided in a light emission section of each color separation prism, and wherein, assuming that an effective image taking dimension in a plane including emission luminous flux of an effective image taking range of said image pickup device is h, the following conditions are satisfied:

$$0.95 < \frac{l1}{h} < 1.3$$

$$0.75 < \frac{l2}{h} < 1.3$$

$$0.4 \leq \frac{l3}{l1+l2} \leq 0.6$$

$$5.5 \leq \frac{L}{h} \leq 7.5$$

where $l_1$, $l_2$ and $l_3$: respective lengths, in the optical axis of the objective, of the first, second and third prisms; and L: length, in the optical axis of the objective, of a luminous flux separation prism.

7. A television camera having a color separation optical system according to claim 6, wherein that surface of the first prism which is in contact with the first air gap is covered with an optical thin film having a wavelength selectivity.

8. A television camera having a color separation optical system according to claim 6, wherein that surface of the second prism which is in contact with the second air gap is covered with an optical thin film having a wavelength selectivity.

9. A television camera having a color separation optical system according to claim 6, wherein the following conditions are satisfied:

$$1.4 \leq Fno \leq 1.8$$

$$1.6 \leq n \leq 1.8$$

$$20.8° < \theta_1 < 29.2°$$

$$-0.5° < \theta_2 - \frac{\theta_1 + \delta + \theta_{max}}{2} < 5.5°$$

$$-0.5° < \theta_3 - \frac{-\theta_2 + \theta_1 + \delta + \theta_{max}}{2} < 4.5°$$

where $F_{no}$: the minimum F number which allows transmission through the color separation optical system;

n: the refractive index of the prism;

$\theta_1$, $\theta_2$ and $\theta_3$: the apex angles of the first, second and third prisms;

$$\delta = \sin^{-1}\left(\frac{1}{n}\right); \text{ and}$$

$$\theta_{max} = \sin^{-1}\left(\frac{1}{2 \times n \times Fno}\right).$$

10. A television camera having a color separation optical system according to claim 8, wherein a first groove for blocking a harmful light is provided in the first prism at a position close to the apex angle of the second prism, and wherein a second groove for blocking a harmful light is provided in the third prism at a position close to the joint plane between the third and fourth prisms.

11. A color separation optical system for effecting color separation on a light from an objective, said color separation optical system comprising, in order according to a direction from which the light travels to the objective: a first prism which has a predetermined apex angle and which serves to extract a predetermined wavelength component; a first air gap; a second prism having a predetermined apex angle; a second air gap; a third prism having a predetermined apex angle; a fourth prism, wherein said third prism and said fourth prism are joined to each other at a joint plane, the joint plane being semi-transmissive, and the light reflected by the semi-transmissive plane being totally reflected by a surface adjacent said second air gap of said third prism; a first groove for blocking harmful light being arranged in the first prism in proximity to the predetermined apex angle of the second prism; and a second groove for blocking harmful light being arranged in the third prism in proximity to the joint plane between the third and fourth prisms.

12. A color separation optical system for effecting color separation in a light from an objective, said color separation optical system comprising, in order according to a direction from which the light travels to the objective:

a first prism which has a first predetermined apex angle and which serves to extract a predetermined wavelength component;

a first air gap;

a second prism having a second predetermined apex angle;

a second air gap;

a third prism having a third predetermined apex angle;

a fourth prism,
  wherein said third prism and said fourth prism are joined to each other at a joint plane, the light reflected by the joint plane being totally reflected by a surface adjacent said second air gap of said third prism;

a first groove for blocking harmful light being disposed in the first prism in proximity to the predetermined apex angle of the second prism; and a second groove for blocking harmful light being arranged in the third prism in proximity to the joint plane between the third and fourth prisms.

13. A system according to claim 12, wherein an image taking device is provided in a light emission section of each color separation prism, and wherein, assuming that an effective image taking dimension in a plane including emission luminous flux of an effective image taking range of said image taking device is h, the following conditions are satisfied:

$$0.95 < \frac{l1}{h} < 1.3$$

$$0.75 < \frac{l2}{h} < 1.3$$

$$0.4 \leq \frac{l3}{l1+l2} \leq 0.6$$

$$5.5 \leq \frac{L}{h} \leq 7.5$$

where $l_1$, $l_2$ and $l_3$: respective lengths, in the optical axis of an objective, of the first, second and third prisms; and L: length, in the optical axis of the objective, of a luminous flux separation prism.

* * * * *

UNITED STATES PATENT AND TRADEMARK OFFICE
CERTIFICATE OF CORRECTION

PATENT NO. : 5,777,674
DATED : July 7, 1998
INVENTOR(S) : RYUJI OHMURO

It is certified that error appears in the above-identified patent and that said Letters Patent is hereby corrected as shown below:

Column 2

Line 16, "risms," should read --prisms,--.

Column 3

Line 25, "a sectional view" should read --sectional view--; and
    Line 28, "a sectional view" should read --sectional view--.

Column 5

Line 15, "reference" should read --reference to--; and
    Line 31, "$l_o$" should read --lo,--.

Column 6

Line 26, "60-4272" should read --60-42702--.

UNITED STATES PATENT AND TRADEMARK OFFICE
CERTIFICATE OF CORRECTION

PATENT NO. : 5,777,674                              Page 2 of 4
DATED      : July 8, 1998
INVENTOR(S): RYUJI OHMURO It is certified that error appears in the above-identified patent and that said Letters Patent is hereby corrected as shown below:

Column 7

Line 20, "with" should read --with the--, and "that the" should read --that--.

Column 8

Line 19, "further, should read -- ¶ Further,--.

Column 9

Line 61, "prevents ghost" should read --prevent ghosts--.

Column 10

Line 23, "$1_1. 1.$" should read --11.1.--;
Line 44, "$1_1/h$" should read --¶ $1_1/h$--;
Line 45, "L" should read --$1_2/h$--; and
Line 61, "$\frac{1_1}{1_1+1_2}=0.51$" should read --$\frac{1_3}{1_1+1_2}=0.51$--

UNITED STATES PATENT AND TRADEMARK OFFICE
CERTIFICATE OF CORRECTION

PATENT NO. : 5,777,674
DATED : July 7, 1998
INVENTOR(S) : RYUJI OHMURO

It is certified that error appears in the above-identified patent and that said Letters Patent is hereby corrected as shown below:

Column 12

Line 31, "5(c)" should read --5(c).--;
    Line 32, "14.30" should read --14.3°--;
    Line 65, "¶ When" should read --When--; and
    Line 67, "$l_1/h$" should read --¶ $l_1/h$--.

Column 13

Line 35, "9.20." should read --9.2°.--.

Column 14

Line 42, "$\theta_{1,\theta_2}$" should read --$\theta_1, \theta_2$--; and
    Line 61, "an" (second occurrence) should read --a--.

Column 15

Line 8, "pickup" should read --taking--;
    Line 21, "the" should read --an--; and
    Line 52, "$\theta_{1,\theta_2}$" should read --$\theta_1, \theta_2$--.

UNITED STATES PATENT AND TRADEMARK OFFICE
CERTIFICATE OF CORRECTION

PATENT NO. : 5,777,674
DATED : July 7, 1998
INVENTOR(S) : RYUJI OHMURO

It is certified that error appears in the above-identified patent and that said Letters Patent is hereby corrected as shown below:

Column 16

```
Line 62, "the" should read --an--; and
Line 63, "on" should read --the--.
```

Signed and Sealed this

Twenty-seventh Day of April, 1999

Attest:

Q. TODD DICKINSON

*Attesting Officer*          *Acting Commissioner of Patents and Trademarks*